United States Patent [19]

Held

[11] Patent Number: 4,816,114
[45] Date of Patent: Mar. 28, 1989

[54] SLIDING SEAL CONSTRUCTION FOR DOUBLE BAND PRESS APPARATUS

[76] Inventor: Kurt Held, Alte Strasse 1, D-7218, Trossingen 2, Fed. Rep. of Germany

[21] Appl. No.: 48,020

[22] Filed: May 7, 1987

[30] Foreign Application Priority Data

May 16, 1986 [DE] Fed. Rep. of Germany ....... 3616619

[51] Int. Cl.$^4$ .......................... B30B 5/06; B30B 15/34
[52] U.S. Cl. ............................... 156/555; 100/93 RP; 100/154; 156/582; 156/583.5
[58] Field of Search ...................... 156/555, 583.5, 580, 156/582; 100/93 RP, 154; 277/234

[56] References Cited

U.S. PATENT DOCUMENTS

| | | | |
|---|---|---|---|
| 3,839,147 | 10/1974 | Daane | 100/154 |
| 4,193,342 | 3/1980 | Held | 156/555 |
| 4,253,391 | 3/1981 | Held | 156/555 |
| 4,285,525 | 8/1981 | Held | 100/93 RP |
| 4,331,073 | 5/1982 | Girola | 100/154 |
| 4,559,249 | 12/1985 | Arigaya | 277/234 |
| 4,623,153 | 11/1986 | Nagasawa | 277/153 |

FOREIGN PATENT DOCUMENTS 2907086 8/1980 Fed. Rep. of Germany.
2937410 4/1981 Fed. Rep. of Germany.

Primary Examiner—David Simmons
Assistant Examiner—J. Davis
Attorney, Agent, or Firm—Toren, McGeady & Associates

[57] ABSTRACT

In a double band press apparatus having an upper and lower endless press belt, each rotatively engaged over a pair of drums defining a reaction zone between opposed outer sides thereof, pressure chambers are defined on the inner sides of each of the press belts for applying a fluid pressure to material passed through the reaction zone. The pressure chambers are bound on one side by pressure plates having a sealing structure extending circumferentially about the pressure chambers, the sealing structure consisting of a continuous sealing member encircling the pressure chamber and applied in sliding engagement with the inner side of the press belts, a one-piece support plate upon which the sealing members are mounted and a continuous resilient boot which extends coextensively with the sealing members and which applies a resilient force pressing the sealing members against the press belts.

53 Claims, 5 Drawing Sheets

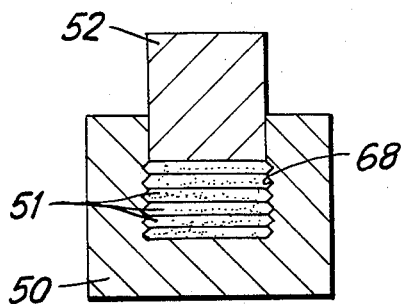 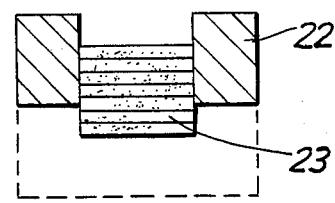
FIG.6  FIG.7
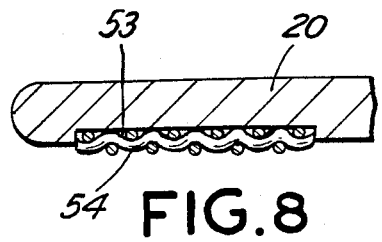 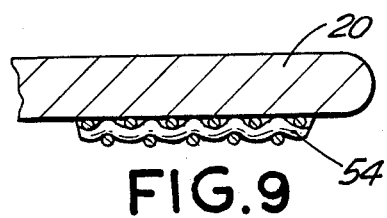
FIG.8  FIG.9
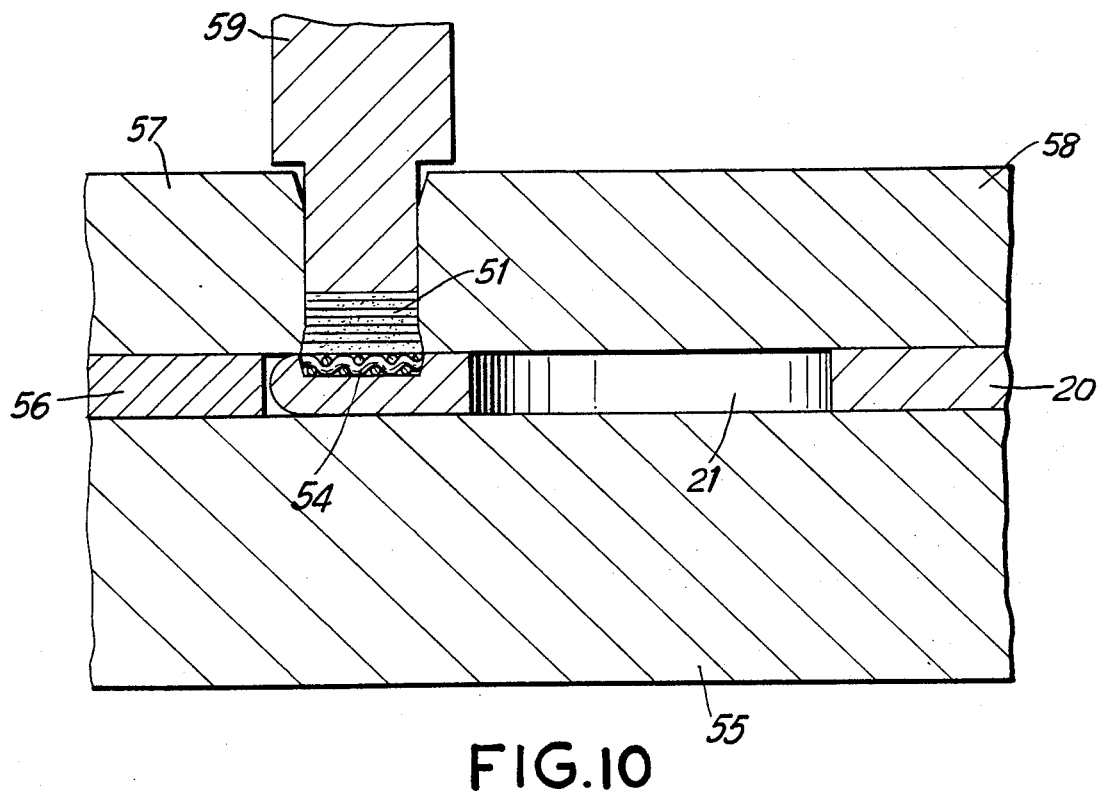
FIG.10

SLIDING SEAL CONSTRUCTION FOR DOUBLE BAND PRESS APPARATUS

The present invention relates generally to double band press belt apparatus and more specifically to a sealing structure for such apparatus.

More particularly, the invention is directed toward a double band press apparatus, wherein an upper and lower endless press belt are each engaged over a pair of reversing drums which are rotatably supported in a rigid press stand, the belts being arranged to define a reaction zone between opposed outer sides thereof and to be movable through the reaction zone to continuously press an advancing material web therebetween. Fluid pressure chambers are defined on the inner sides of the press belts for applying fluid pressure to the advancing material within the reaction zone and the present invention is particularly directed toward a seal construction for sealing the fluid pressure chambers.

In double band presses, in accordance with the prior art, e.g., DE-OS No. 24 21 296, endless web-shaped materials are continuously produced which are used particularly for fabrication of decorative layered laminates, chipboard, fiber plates, copper clad electrolaminates and the like. These double band presses comprise two endless revolving press bands or press band packages (see DE-OS No. 33 15 367), between which the material web is cured under the action of pressure and, if required, also with the simultaneous application of heat while being transported in an advancing direction. In order to effect the application of pressure acting upon the material web, so-called isobaric machines are provided with pressure chambers within which pressure is established by fluid means such as oil or compressed air. These pressure chambers are bounded on one side by a pressure plate and on the opposite side by the press band. However, they must be sealed with respect to the exterior atmosphere along the periphery or the edges of the pressure chambers so that no undesirable pressure loss will occur since such pressure loss can cause soiling or damage of the material web as well as increased energy expenditure in the double band press apparatus.

Sealing of the peripheral edges of the pressure chambers is effected by sliding seal members inserted into the pressure plate so as to surround the pressure chamber, such sealing members being in sliding contact on one side of the press band with a certain contact pressure. Since the pressure plate is fastened so as to be stationary in the apparatus and since the press band moves, the press band will slide along the face or surface of the seal, thereby producing a frictional force acting thereon. The fluid pressure means which are contained within the pressure chamber also exerts a pressure force extending essentially outwardly of the pressure chamber against the seal member which is in sliding engagement with the press belt. Such pressure forces as well as the frictional forces occurring by sliding engagement must be absorbed by the sealing member without the occurrence of unacceptable deformation.

In a sliding seal design known in the prior art from DE-PS No. 27 22 197, the seal consists of a sealing member which is rectangular in cross section and which is mounted in a U-shaped retaining strip. The U-shaped retaining strip is inserted into a groove in the pressure plate and has support angles attached at a side thereof which abut in recesses in the pressure plate. Frictional forces are thus introduced by the sealing member into the pressure plate through the U-shaped retaining strip and the support angles. The pressure forces exerted by the pressure means inside the pressure chamber upon the sealing member are also transmitted by the U-shaped retaining strip to the pressure plate, since the U-shaped retaining strip rests at the walls of the groove which faces away from the pressure chamber.

In order that no leakage will occur from the sealed pressure chamber during operation of the double band press, the sliding seal must be able to adapt to changing thicknesses of the material web which is processed through the press. For this purpose, the known sliding seal member is arranged in a groove located in the pressure plate so as to be movable in a direction perpendicular to the surface of the web and, thus, the seal moves into and out of the groove. Since the U-shaped retaining strip is pressed against the wall facing away from the pressure chamber by the pressure forces acting inside the pressure chamber, a frictional force again occurs in case of perpendicular motion which impairs this perpendicular motion. An additional frictional force in the perpendicular direction which must be overcome exists at the support surfaces in the recesses since the support angles are rigidly connected with a U-shaped retaining strip. Thus, adjustment of the seal in the direction perpendicular to the face of the web occurs with a certain delay, whereby increased leakage rates will arise for the pressure means. It has been shown in actual practice that these frictional forces can become sufficiently large particularly with higher pressures that jamming of the sliding seal will occur in the groove. If such jamming occurs while the sliding seal is moving out of the groove, a sudden pressure drop will occur having a negative effect upon the quality of the material web.

It is particularly disadvantageous if such jamming of the sliding seal occurs during motion inwardly of the groove since, then, increased wear of the sliding seal occurs. In certain circumstances, even total destruction of the seal and of the expensive press band may result.

Accordingly, the invention is directed toward providing a sliding seal construction at a double band press such that it is easily movable in directions perpendicular to the surface of the material web without substantial friction and so that it can, at the same time, withstand forces arising during operation of the double band press without being deformed or destroyed.

SUMMARY OF THE INVENTION

Briefly, the present invention may be defined as an improvement in the sealing arrangement for a double band press apparatus which includes an upper and a lower endless press belt, each engaged over a pair of reversing drums rotatably supported in a rigid press stand, the press belts being arranged to define a reaction zone between opposed outer sides thereof and to be movable about the drums through the reaction zone to continuously press an advancing material web therebetween. The apparatus includes means defining fluid pressure chambers on inner sides of each of the belts opposed to the outer sides for applying fluid pressure to the advancing material web within the reaction zone. The means defining the fluid pressure chambers comprise pressure plates affixed in the apparatus bounding the pressure chambers on sides thereof opposite said inner sides of the press bands and sealing means mounted to said pressure plates extending to circumferentially bound the pressure chambers. In accordance with the present invention, the sealing means are formed to comprise sliding seal members pressed in sliding engagement with the inner sides of said press belts and extending continuously to encircle said pressure chambers, a one-piece support plate having said seal members affixed thereto extending at least partially within said pressure chamber and a continuous resilient boot member extending generally coextensively with said seal members mounting said support plate on said pressure plate and oper ating to apply a resilient force tending to press said seal members against said press belts.

In accordance with more specific aspects of the present invention, the seal members are preferably formed from carbon fiber hose mesh consisting of individual layers and pressed into a compact body which is impregnated with polyether-ether ketone. Such a sealing member will withstand high tensile forces and will have a friction coefficient which is not too high when in sliding engagement with the press bands. In order to enable minor leakage which may nevertheless occur even with the sealing arrangement in accordance with the invention, a further embodiment of the invention provides a second sliding seal member sealing the surrounding environment around the first sliding seal member in such a manner that a buffer space is formed between the two sliding seal members which serves for collection of any leakage fluid. Such leakage fluid may then be aspirated away through a bore in the pressure plate.

Advantages achieved with the present invention consist particularly in that the sliding seal member can conform to deviations in the press band in directions taken perpendicularly to the surface thereof which may arise due to unavoidable thickness differences in the advancing material web. This will occur practically without any delay. As a result, sliding contact of the seal member on the press band will always be insured so that no leakage points will occur and no loss of pressure will develop. Jamming of the sliding seal member in directions perpendicular to the surface of the press band will be avoided and the double band press will thus be more operationally dependable and capable of operating with smaller energy expenditures.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DESCRIPTION OF THE DRAWINGS

In the drawings:

FIG. 6 is a cross-sectional view showing a mold for fabrication of a seal member;

FIG. 7 is a cross-sectional view showing a mold which has been partially etched away during fabrication of the seal member;

FIG. 8 is a sectional view showing an edge region of a support plate prior to placement of a seal member in accordance with an additional embodiment of the invention;

FIG. 9 is a sectional view of an edge area of a support plate prior to placement of a seal member in a further embodiment of the invention;

FIG. 10 is sectional view showing a fixture for applying a seal member upon a support plate in another embodiment of the invention;

DETAILED DESCRIPTION OF THE PREFERRED EMBODIMENTS

Figure 1:
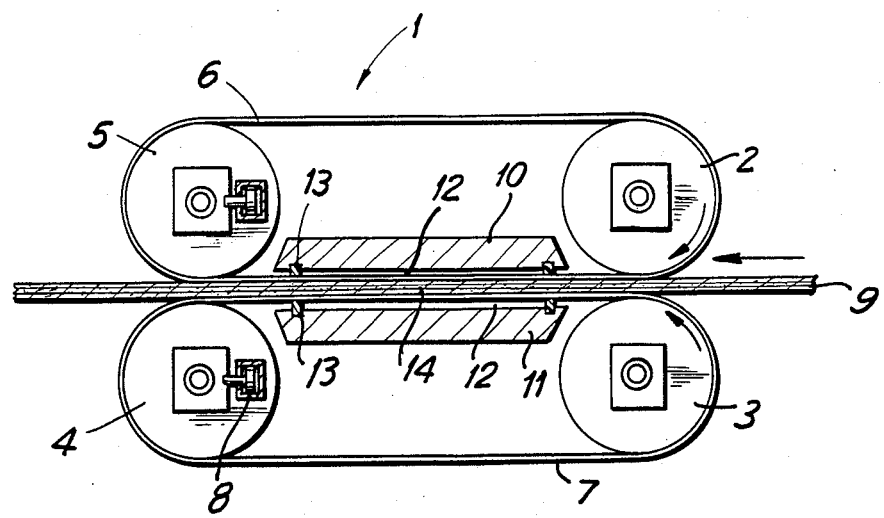
FIG. 1 is a schematic side view of a double band press.
Figure 2:
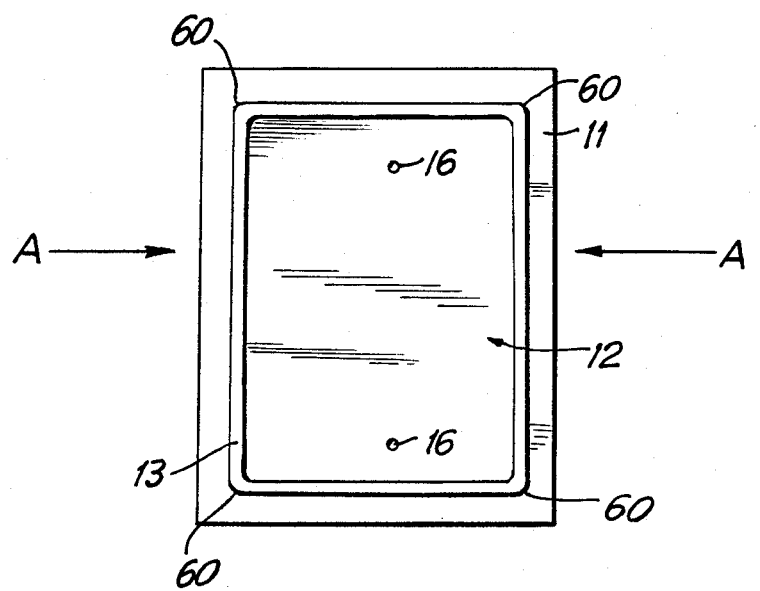
FIG. 2 is a plan view of a part of the double band press viewed from the inner side of a press band thereof.
Figure 3:
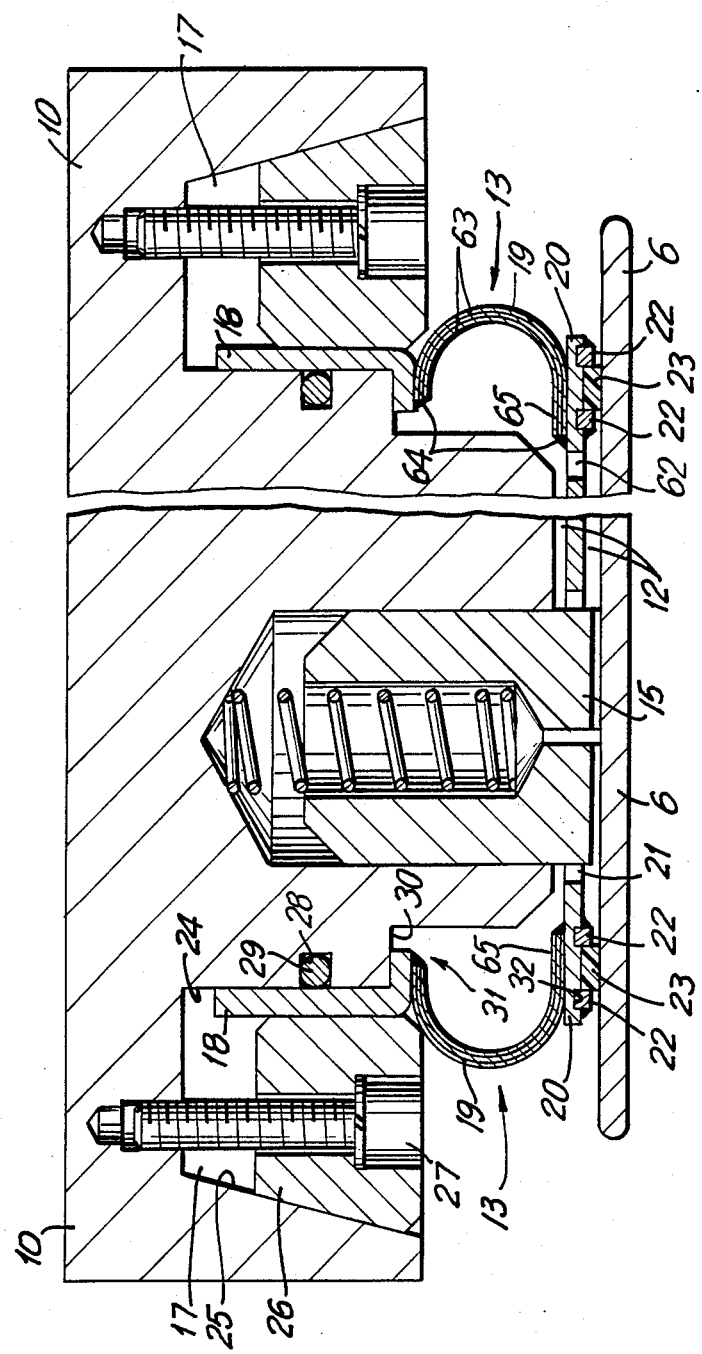
FIG. 3 is a sectional view taken along the line A—A in FIG. 2.

Referring now particularly to FIGS. 1, 2 and 3 of the drawings, wherein a first embodiment of the invention is shown, a double band press 1 is provided with four reversing drums 2, 3, 4, 5 supported in a press stand (not shown) with a press band 6 being mounted about the drums 2, 5 and with a press band 7 being mounted about the drums 3, 4. The drums rotate in accordance with the arrows shown therein and the press bands are stretched taut by hydraulic cylinders 8.

The press bands 6 and 7 consist usually of high tensile steel and are arranged so as to define a reaction zone 14 therebetween through which a material web 9 is moved in the direction of the arrow shown from the right side toward the left side in order to be compacted or pressed with the simultaneous application of heat and pressure in the reaction zone 14. The material web 9 may consist of laminated materials, fiber-binding agent mixtures impregnated with synthetic resins, or like materials. Of course, if appropriate, the material to be treated in the reaction zone may undergo compaction without heating or even with cooling.

For the transmission of heat to the material web 9 in the reaction zone 14, the reversing drums 2 and 3 are heated at the inlet of the reaction zone and, thus, the press bands 6 and 7 are also heated. The quantity of heat absorbed by the sections of the press bands 6 and 7 which are heated is caused to flow into the reaction zone 14 by the heat absorption capacity of the bands and, as a result, the material web 9 is heated, thereby curing the material to be pressed. Naturally, heating of the material to be pressed can also be accomplished by other means, for example, by heat transmitting elements 15 which are shown in FIG. 3.

The press band includes a pair of pressure plates 10 and 11 which are located on the inner sides of the press bands 6 and 7 and which together with seals 13 define pressure chambers 12 on the inner sides of the press bands adjacent the reaction zone 14.

The heat transmitting elements 15 are arranged in the pressure chambers 12 and they transmit heat flow from the heated pressure plates 10, 11 which are at a higher temperature than the press bands 6 and 7 and, from there, the heat is transmitted to the material web 9. The heat conducting elements 15 may be designed in accordance with prior art publication DE-OS No. 33 25 578.

In order to generate pressure which will act upon the material web 9 passing in the reaction zone 14, a pressurized fluid pressure medium is introduced into the pressure chambers 12. The pressure chambers 12 are defined in the space between the pressure plates 10, 11 and the inner sides of the press bands 6, 7. Thus, each pressure chamber 12 is bounded on the side thereof opposite the press band 6, 7 by the heated pressure plate 10, 11. Furthermore, the pressure chambers 12 are peripherally bounded by the seal members 13 which extend continuously around the periphery of each of the pressure chambers 12, as seen more clearly in FIG. 2, and which are in sliding engagement with the inner sides of the press bands 6, 7. As will be evident from FIG. 2, the pressure chambers 12 have a substantially rectangular configuration formed with rounded corners 60 having a radius which is as small as possible since the sliding seal members 13 which are formed from a single continuous piece must be bent to assume the desired shape of the pressure chambers 12.

Synthetic oil is used as the pressure medium and the synthetic oil is supplied into the pressure chambers 12 through bores 16 in the pressure plates 10, 11. However, it should be understood that a gaseous pressure medium such as, for example, compressed air, may be utilized equally as well.

The sectional view shown in FIG. 3 depicts by way of example the upper pressure plate 10 and the seal member or assembly 13 thereof. As will be seen from FIG. 3, the seal assembly 13 formed in accordance with the present invention essentially consists of a support plate 20 having a sealing body or member 23 and a boot member 19 which is fastened at the pressure plate 10 and from which the support plate 20 is attached with the pressure plate 10. The pressure plate 10 is formed with a stepped recess 31 and with an adjacent groove 17 encircling the edge of the pressure chamber 12. A retention member 18 consisting of steel and formed with an L-shaped cross section is provided which encircles the pressure chamber 12 and whose legs extend both into the groove 17 and the stepped recess 31. As is evident from FIG. 3, the L-shaped retention member 18 has a shorter leg at which the elastic or resilient boot 19 is attached, with the longer leg of the member 18 extending into the groove 17. The resilient boot 19 consists of metal and is formed with an aproximately semicircular cross section. The boot 19 is attached by welding in such a manner that it opens in a direction facing toward the pressure chamber 12. The boot 19 is composed of individual superimposed rectangular metal foils or sheets 63 which are welded with each other along edges 64 in order to form a sheet metal package. High tensile spring steel is, for example, suitable for use in forming the boot 19 and this sheet metal package is subsequently bent in such a manner that it has a semi-circular U-shaped cross section, as seen in FIG. 3, and so that it exhibits a trough-like configuration. The sheet metal package has imparted thereto a high elasticity due to the construction thereof and it exhibits a strong spring action. During its formation, the sheet metal package is subsequently placed into a sectional mold and is bent at appropriate spots in order to form a rectangle, as indicated in FIG. 2 with reference numeral 13, whereby the boot 19 forms part of the seal assembly 13. The boot 19 is then welded together at its ends so as to form a continuous member. The sectional mold, which is subsequently removed, supports the bending of the rounded corners 60 and the individual metal foils or sheets 63 of the sheet metal package can consist of electrogalvanically formed parts which are already separated in the desired semi-circular shape galvanically and then are welded with each other at the edges 64. As a result, the described formation step of the bending of the sheet metal package into the half-round shape can be eliminated.

The end of the metal boot 19 lying opposite the retention member 18 is again welded together with the stiff support plate 20 consisting of metal, as can be seen in FIG. 3. The rectangular support plate 20 is constructed in one piece and extends across the entire width and length of the pressure chamber 12 somewhat beyond the edges thereof and comprises several passages 62 within the pressure chamber 12 through which the pressure medium supplied through the bore 16 can pass so as to act upon the press band 6. The heat transmitting elements 15 protrude to the press band 6 through additional passages 21 in the pressure plate 20 within the pressure chamber 12. The heat transmitting elements 15 rest, on the one hand, at the heated pressure plate 10 and contact, on the other hand, the press band 6 so as to drag thereon so that they will transmit the heat from the pressure plate 10 to the press band 6.

A depression 32 is formed along the edge thereof in the support plate 20 and a mounting 22 is welded therein, the mounting 22 having the seal member 23 fastened or supported therein. In this end region of the support plate 20, no further passages are provided and especially no passages leading to the outer atmosphere are formed.

In the formation of the sliding seal assembly 13, the longer leg of the retention member 18 is positioned so as to rest against a vertical wall 24 of the groove 17 and the shorter leg is positioned to rest at a horizontal wall 30 of the stepped recess 31 in the pressure plate 10. The groove 17 includes a wall 25 which extends obliquely so that a continuous wedged strip 26 inserted into the groove 17 will tightly clamp the retention member 18 at the wall 24. The wedged strip 26 is fastened by screws 27 which are appropriately spaced at the pressure plate 10. A groove 28 is formed in the wall 24 and a sealing wire 29 having a rounded cross section and which consists of aluminum, soft copper or a similar metal is inserted into the groove 28 in such a manner that it is pressed against by the longer leg of the retention member 18 and pushed into the groove 28. By means of this sealing wire 29, fluid pressure is prevented from escaping through the retention member 18, the walls 30 and 24 into the groove 28 and, thus, to the atmosphere. Instead of the metallic sealing wire 29, an O-ring consisting of an elastomer may alternatively be inserted into the groove 28 if the temperature of the pressure plate permits utilization of such material.

The mounting arrangement, in which the seal member or body 23 is fastened, is welded in a depression 32 which lies on a side of the support plate 20 facing the press band. This seal member 23 has an essentially rectangular cross section and rests against the press band with the side thereof facing away from the support plate 20. The press band moves in sliding engagement along the seal member 23 during operation of the double band press 1. The seal member 23 consists of a plastic material which has sliding characteristics. Duroplasts or thermoplasts can be used for this purpose since these materials resist higher temperatures prevailing in the reaction zone 14. An example of such materials is polyimides. These plastic materials can, if required, be provided with filling materials. It has been shown that such materials with sliding characteristics are particularly suitable if they consist of a hose mesh designed in a multilayer fashion from cabon fiber tissue which is impregnated with an aromatic polyether, namely a polyether-ether ketone, which is subsequently pressed into the seal body 23 in the mounting 22. In order to effect good sliding characteristics, the material should have a low friction coefficient and have good temperature durability. It should be capable of withstanding high tensile forces due to reinforcement with carbon fibers.

The pressure chamber 12 is completely sealed on its sides from the atmosphere by the construction of the seal assembly 13 described above. It will be seen that the total periphery of the chamber 12 is sealed by the sliding engagement of the seal member 23 against the press band 6 and that, since the support plate 20 is formed devoid of any pasages leading to the atmosphere in the edge regions thereof, a completely sealed arrangement is provided. In the region oriented toward the pressure plate 10, the metallic boot 19 prevents pressurized fluid from escaping into the atmosphere since, as previously described, it extends coextensively with the seal member 23 around the periphery of the sealing chamber 12 and is welded on both sides to the support plate 20 and to the retaining member 18. Furthermore, as has been described previously, since the retaining member 18 is pressed against the vertical wall 24 and against the sealing wire 29, no pressure fluid can escape past the retention member 18.

The sliding seal assembly 13 of the present invention is capable of carrying the different forces which occur in the operation of the double band press 1. As is seen from FIG. 3, a force acts upon the sliding seal assembly 13 from the pressure chamber 12 which acts to press the seal assembly 13 outwardly away from pressure chamber 12 towards the atmosphere. The sliding seal assembly 13 is a continuous structure and is connected directly with the support plate 20. The pressure force acting in the longitudinal as well as in the lateral direction is introduced into the support plate 20 which consists of a unitary one-piece member which carries this force. In the context discussed above, the longitudinal direction is intended to be the feed direction of the material web 9 which is designated by the arrow in FIG. 1 and the lateral direction is intended to be the direction extending perpendicularly to the longitudinal directional plane of the material web 9. By suitably dimensioning the support plate 20 which consists of a high tensile metal, the double band press 1 may thus be operated with any required pressures in the pressure chamber 12.

The sliding seal assembly 13 is installed stationary relative to the pressure plate 10 and it is pressed against the press band 6 by the pressure of the fluid pressure agent of the pressure chamber 12 acting in the semi-circular passage of the metal boot 19 and, additionally, by the spring force of the metallic bellows or boot 19. The press band 6, however, moves with a certain speed relative to the stationary sealing assembly 23 so that a frictional force arises which acts in the longitudinal direction of the double band press 1. This frictional force which is substantially proportional to the contact pressure between the sealing member 23 and the press band 6 is absorbed by the sealing member 23 and is introduced into the pressure plate 10 through the support plate 20 and the metal boot 19. Since the seal member 23 consists preferably of a high tensile carbon fiber laminate impregnated with polyetherether ketone, even higher pressures cannot exert a destructive effect upon the seal assembly 13.

Since the material web 9 will always exhibit certain variations in thickness as viewed across its width and length, the sliding seal assembly 13 must be movable in directions perpendicular, to the surface of the press band 6 so that the seal member 23 may be maintained in contact against the press band 6 in all circumstances during relative sliding movement between the band 6 and the seal member 23. Otherwise, leakage from the pressure chamber 12 will be unavoidable and the pressurized fluid agent will thereby escape therefrom so that higher energy expenditures will become necessary in order to replace lost pressurized fluid.

Because of the elasticity of the metallic boot 19, the sliding seal assembly 13 is freely movable in the perpendicular direction, i.e., perpendicular to the surface of the press band 6, and it will follow perpendicular deviations of the press band 6 so that leakage from the pressure chamber 12 will be avoided. It is expedient that this motion in the perpendicular direction occurs without friction whereby no delays in the vertical motion will arise and tilting or jamming of the sliding seal assembly 13 will be precluded.

Figure 12:
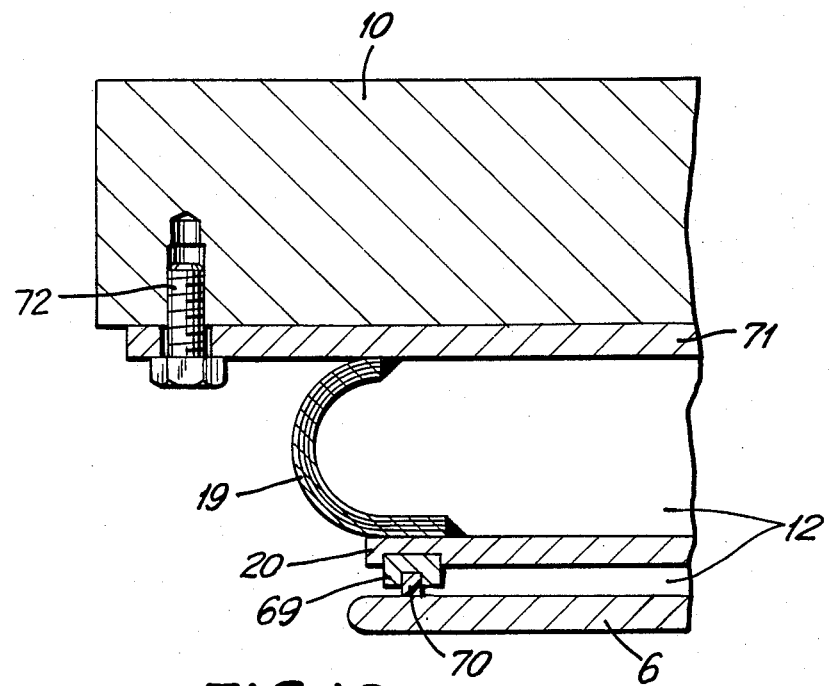
FIG. 12 is a partial sectional view of an edge region of a pressure plate showing a further embodiment of the invention.

A further embodiment of the invention is depicted in FIG. 12. In this embodiment, the pressure plate 12 extends essentially parallel to the press band 6 without recesses and grooves. Additionally, a one-piece support plate 71 is arranged parallel to the support plate 20 on the side of the metallic boot 19 opposite from the support plate 20. This additional support plate assumes the function of retention. The support plate 71 is fastened with screws 72 to the pressure plate 10. The metallic boot 19 is again welded with its end facing away from the support plate 20 to the support plate 71. By this construction and retention arrangement, the height of the pressure chamber 12 is increased as compared with that in the embodiment of FIG. 3 and this may be a significant advantage if various installations must be contained in the pressure chamber 12.

Figure 11:
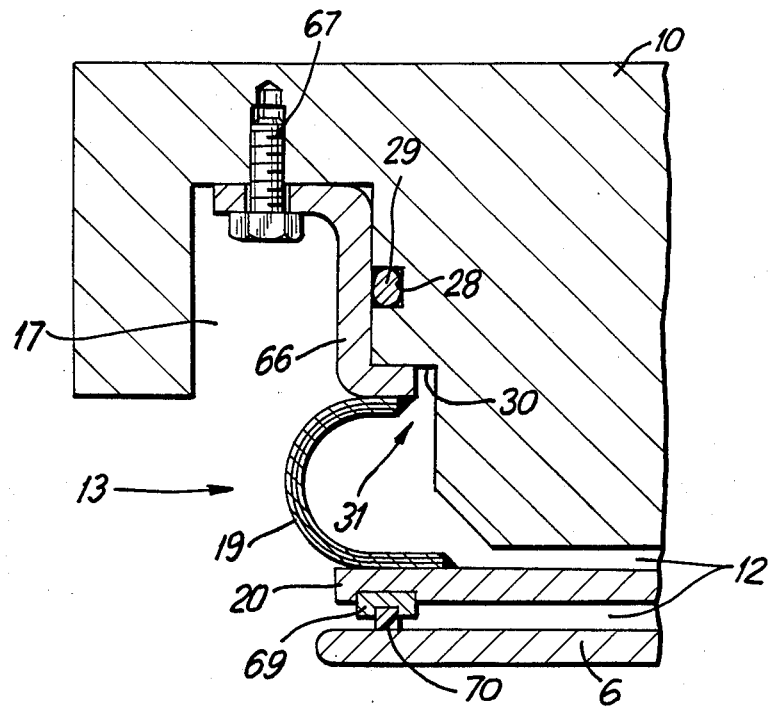
FIG. 11 is a partial sectional view of an edge region of a pressure plate in accordance with another embodiment of the invention.

A somewhat modified form for the retention arrangement of the sliding seal assembly 13 is shown in FIG. 11. In this embodiment, there is provided a retention member 66 which has a stepped configuration having two horizontal legs and one vertical leg. One of the horizontal legs is again welded to the metallic boot 19 and rests at a wall 30 of the stepped recess 31 in the pressure plate 10. The second horizontal leg opposite from the metallic boot 19 rests at a bottom surface of the groove 17 and is fastened with appropriately spaced screws 67 to the pressure plate 10. The balance of the design of this sliding seal assembly 13 shown in FIG. 11 corresponds with the assembly 13 shown in FIG. 3 previously described.

The construction of the sliding seal assembly of the invention has been described as including the upper pressure plate 10. Naturally, such a sliding seal assembly may also be provided in the lower pressure plate 11 of the double band press 1 shown in FIG. 1. It should be understood that, although in the present application, the description is provided only for the upper pressure plate 10, similar structure may be provided in the lower plate 11. Thus, in the description which follows, wherein further embodiments of the invention are disclosed, it will be understood that, although reference is made only to the upper pressure plate 10, the seal assembly of the invention is thus not restricted in its use.

Figure 4:
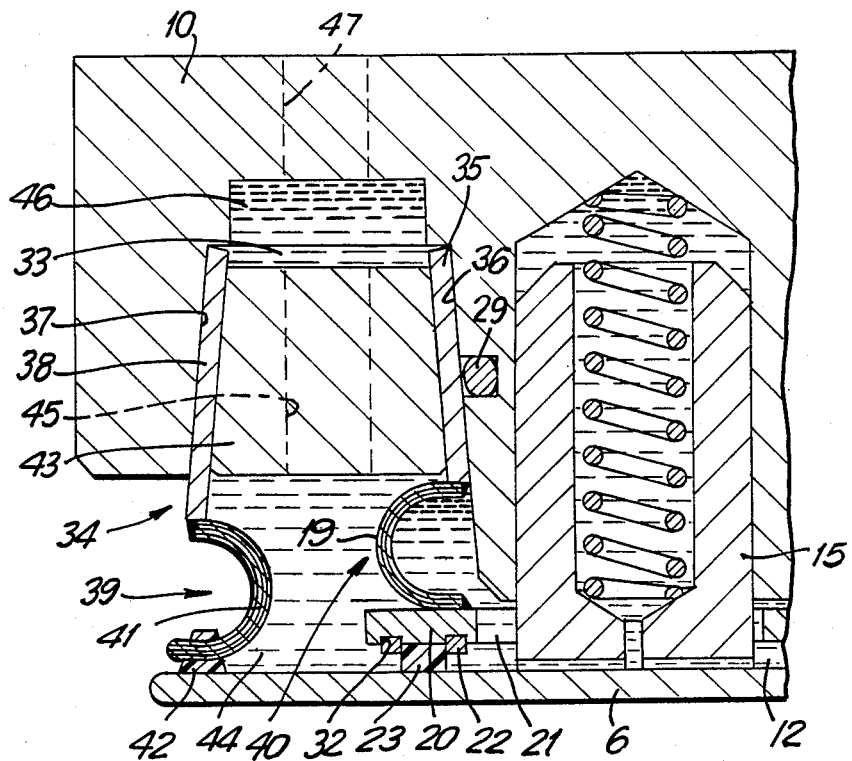
FIG. 4 is a partial sectional view taken through an edge region of a pressure plate in accordance with the present invention showing a further embodiment of the invention involving a double seal.

FIG. 4 shows a further embodiment of the invention which consists of a twin seal arrangement having two adjacent sliding seal assemblies 39 and 40, both of which extend continuously to encircle the pressure chamber 12. In this embodiment of the invention, the outer sliding seal assembly 39 completely encircles the inner sliding seal assembly 40 and extends completely thereabout. In the edge region of the pressure plate 10, a recess 34 is provided for receiving the sliding seal assemblies and an encircling groove 33 having beveled walls is fabricated in the recess 34. A tightly clamped retention member 35 for the inner seal assembly 40 is provided at the wall 36, this retention member 35 being provided in the embodiment of FIG. 4 with only one single leg. The inner sliding seal assembly 40 is constructed similarly to the seal assembly 13 shown in FIG. 3 and identical parts are identified with identical reference numerals. A retention member 38 for the outer seal assembly 39 is clamped in a wall 37 of the groove 33. A metallic boot 41 with an approximately semi-circular cross-sectional configuration is welded to an end of the retention member 38 in such a manner that it opens in a direction facing away from the pressure chamber 12 and toward the atmosphere. A seal member 42 is fastened at the end of the metallic boot 41 on the side of the press band 6 and the seal member 42 is pressed against the press band 6 by the resiliency or elasticity of the boot 41. The retention members 35 and 38 are also clamped at appropriate walls 36 and 37 of the groove 33 by means of the wedged strip 43 inserted in the groove 33 and extending in an annularly encircling manner; this strip having a trapezoidally-shaped cross section. The wedged strip 43 is bolted to the pressure plate 10 at appropriately selected locations.

Between the inner seal assembly 40 and the outer seal assembly 39, there is thus formed a hollow space or chamber 44 which surrounds the pressure chamber 12 along the edge of the pressure plate 10. The chamber 44 is bounded toward its sides by the sliding seal assemblies 39 and 40 and on one side by the press band 6 and on the opposite side by the wedged strip 43. Any leakage from the pressure chamber 12 which occurs through the sliding seal assembly 40 will collect in the chamber 44. The wedged strip 43 is formed with throughbores 45 extending perpendicularly from the band 6 at selected locations and thereby there is formed a fluid passage from the hollow chamber 44 into a collecting space 46 having a lower pressure therein. Leakage of the fluid pressure agent collected in the chamber 44 is thereby aspirated away through the bores 45 into the space 46 and from there through bores 47. This fluid pressure agent which has been aspirated away may subsequently be again supplied to the fluid pressure medium in the circulation cycle of the apparatus. Thus, as a result of this construction, soilage or damage of the material web 9 by fluid pressure medium escaping sidewise from the pressure chamber 12 is prevented.

The outer seal assembly 39 is formed with nearly the same construction as the inner seal assembly 40. As will be noted from FIG. 4, it does not comprise a support plate and, since a lower pressure exists in the space 44, no longitudinal or transverse forces oriented toward the atmosphere will arise which would otherwise have to be carried by the outer sliding seal assembly 39. The pressure chamber 12 is indicated by small lines in FIG. 4 in order to clarify the pressure agent. In the hollow space 44, the very much lower pressure is depicted by less dense broken lines. Only frictional forces arise at the seal member 42 of the outer seal assembly 39 and these are introduced into the pressure plate 10 through the metallic boot 41 and the retention member 38. The seal member 42 may be constructed like the seal member 23 of the inner seal assembly 40 and, as shown in FIG. 4, it is directly fastened to the metallic boot 41 without the interposition of a support plate. Since the contact forces and, thus, the frictional forces are lower in the case of the outer seal assembly 39 than those which arise in the inner seal assembly 40, generally a seal member 42 structured in a somewhat simpler manner will be sufficient. This may consist of an encircling continuous metallic band which is welded to the boot 41 and upon which an elastomer forming the sliding surface has been vulcanized. It is also possible to vulcanize the elastomer directly upon the boot 41 at a corresponding location.

As has been discussed previously, the one-piece support plate 20 will carry lateral and longitudinal forces exerted upon the sliding seal assembly 13 by the pressure existing in the pressure chamber 12. It will be evident that the volume and, therefore, the strength of the support plate 21 will be reduced due to the necessity for providing therethrough passages 21 for the heat transmitting elements 15 and, accordingly, the possible necessity for numerous heat transmitting elements 15 could give rise to an insufficiency in the strength of the support plate 21 with regard to supporting the forces arising during high pressure. In principle, it would be possible to increase the thickness of the material for the support plate in accordance with the forces which are to be withstood. This, however, may not be possible particularly with regard to the support plate 10 in the case of an installation of limited space or conditions. In such an eventuality, the support plate could be provided in accordance with an embodiment shown in FIG. 5.

Figure 5:
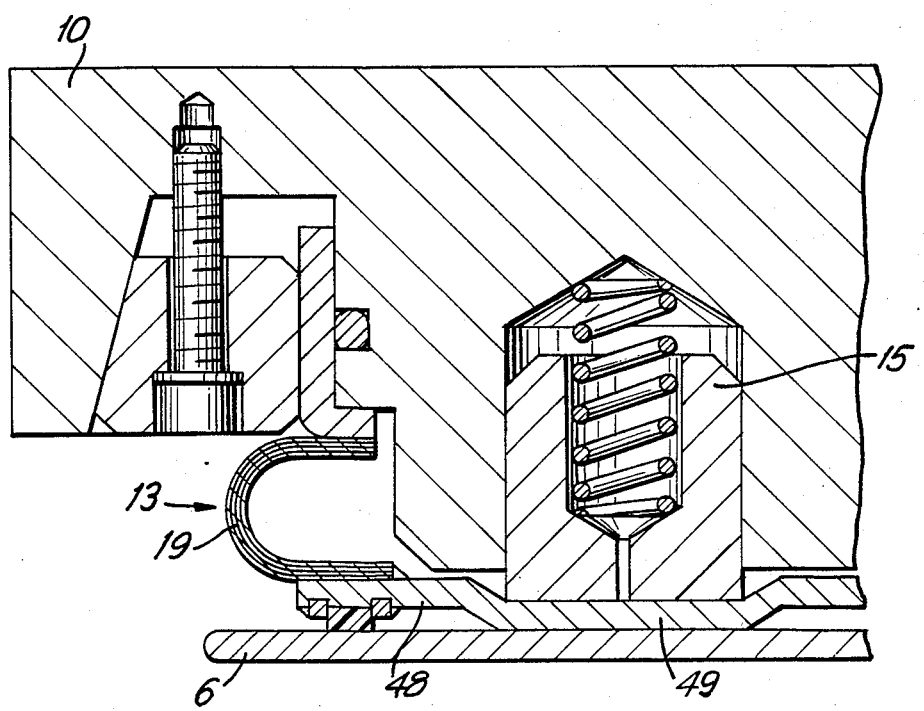
FIG. 5 is a partial cross section taken through an edge region of a pressure plate showing a further embodiment of the invention.

In FIG. 5, a support plate 48 is shown which comprises indentations 49 at locations where the heat transmitting elements 15 are fastened in the pressure plate 10. Such indentations 49 are in surface contact with both the transmitting elements 15 and the press belt band 6. Because of this surface contact, heat flow will occur from the heated pressure plate 10 through the heat transmitting elements 15 and through the indentations 49 in the support plate 48 into the press band 6. The support plate 48 thus has the same cross section throughout and will therefore be capable of carrying the longitudinal and lateral stresses introduced even at higher pressures. Advantageously, because of this, longitudinal forces arising due to frictional contact of the heat transmitting elements will be transmitted through the support plate 48 and the metal boot 19 into the pressure plate 10.

In FIG. 6, there is shown a mold 50 which can be utilized for the fabrication of the seal member of the invention.

The mold 50 consists of a metallic material and is formed with a U-shaped profile or cross section which extends longitudinally in a closed rectangular formation such as that indicated in FIG. 2 for the shape of the seal assembly 13. Individual layers 51 from carbon fiber hose mesh which are impregnated with polyether-ether ketone resin are inserted into the mold 50 until a desired thickness is achieved. Subsequently, a frame-shaped pressure ram 52 having a rectangular cross section is placed upon the carbon fiber hose mesh. After that, pressure is applied with the pressure ram 52 to the carbon fiber hose mesh with simultaneous application of heat so that the resin melts. After the resin has melted, the mold 50 is cooled while pressure is continued to be applied, whereby the resin partially crystallizes and bonds individual layers 51 into a compact laminate forming the seal member 23 proper as well as bonding this laminate to the mold 50. In order to assist bonding of the resin with the mold 50, additional undercuts 68 may be fabricated at the inner walls of the section as indicated in FIG. 6. As soon as the resin has cooled, the pressure ram 52 is removed and parts of the mold 50 are etched away as indicated in broken lines in FIG. 7. Since the polyether-ether ketone carbon fiber laminate is resistant to most chemicals, particularly those used normally as etching agents for metals, the laminate is not attacked during the etching process and only desired portions of the metal mold 50 are etched away. The parts of the mold 50 are thus etched away to an extent such that a mounting 22 which will enable welding attachment of the seal member 23 into the support plate 20 remains and simultaneously the seal member 23 will thus project beyond this mounting portion 22.

In FIGS. 8-10, there is shown a further method for fabricating the sealing member 23, wherein a metal gauze 54 made from stainless steel is placed in the edge area of the support plate 20 where the sealing member is to be installed so as to encircle the edge area, as is best seen in FIG. 9. This metal gauze is then welded with the support plate 20. The welding operation may be performed by projection welding, rolling seam welding or carbon dioxide laser welding. It is also possible to provide a recess 53 encircling the edge area of the support plate 20 and then to insert the stainless steel gauze thereinto as shown in FIG. 8 which is then welded to the support plate 20. The stainless steel gauze 54 serves the purpose of improving adhesion between the support plate 20 and the seal member 23. As will additionally be seen from FIG. 10, the seal member 23 is subsequently pressed onto the support plate 20 and, for this purpose, the plate 20 is placed upon a stable base plate 55 together with an edge strip 56 of the same thickness as the support plate 20. A filler frame 57 is placed over this edge strip 56 in the support plate 20 which completely covers the edge strip 56 and partially covers the edge region of the support plate 20 which, however, leaves that region, in which the sealing member 23 is to be fastened, free. In the inner region of the support plate 20, an additional filler plate 58 is inserted. Thus, a space between the frame 57 and the filler plate 58 remains free because of the special steel gauze welded to the support plate 20. Into this space, individual layers of carbon fiber hose mesh 51 which are impregnated with polyether-ether ketone resin can be placed in a desired quantity. Subsequently, the layers of hose mesh 51 are heated by means of a pressure ram 59 under pressure and cooled so that the layers 51 are bonded to each other to form a compact laminate which comprises the seal member 23. The seal member 23 is at the same time bonded with the support plate 20 by the crystallized polyether-ether ketone resin. This connection is strengthened by the undercuts of the stainless steel gauze 54. The seal member 23 has no mounting in the embodiment herein described, but rather it is directly fastened upon the support plate 20. Thus, frictional forces are supported directly by the highly tensile carbon fibers of the seal member 23 and they are further directed to the support plate 20.

As already stated, other plastics are suitable as a material for the seal member. In the embodiment shown in FIG. 11, a seal member 70 which is continuous around the edges is shown and which consists of a polyimide. This seal member 70 is mounted in a U-shaped retaining strip 69 which also encircles the edge area and is clamped therein. The U-shaped retaining strip consists of metal and carries the frictional forces so that these will have no detrimental effect upon the plastic material which has a comparatively low tensile strength. The U-shaped retaining strip 69 is again welded with the support plate 20 and a refractory thermoplast or thermoplast compound material, especially a carbon fiber laminate with polyether-ether ketone resin, is preferred as the material for the seal member 23, as has been already described above. However, other materials may also be used and, for example, a continuous nickel layer encircling the edge area can be selectively galvanized upon the support plate 20 to form the seal member 23.

The press band 6 may be hard chrome plated to form the opposing sliding surface. In order to reduce wear, a suspension from hard particles such as silicon carbide, boron nitride or industrial diamonds can be introduced into this nickel or chromium layer. Furthermore, it is also possible to install particles having dry lubricant properties, such as teflon, graphite, or molybdenum disulfide. However, for the present invention involving the sliding seal assembly at a double band press, it is essential to provide the one-piece support plate 20 where the seal member 23 is fastened so as to encircle the edge of the pressure chamber 12 for carrying longitudinal and lateral forces and those in the vertical direction and the elastic continuous boot 19 which also surrounds the pressure chamber with which the support plate 20 is fastened to the pressure plate 10 or 11 and which affords a friction-free mobility of the sliding seal assembly 13 in the perpendicular direction.

It will thus be seen that the present invention is directed toward providing a sliding seal assembly at a double band press which comprises two press bands stretched respectively around two reversing drums. For generation of compression pressure upon a material web continuously advancing between the press bands, pressure chambers are arranged on the inner sides of the press bands which are bounded in the direction perpendicular to the press band by pressure plates and in the horizontal direction by sliding seal assemblies. The sliding seal assemblies consist of a continuous seal member encircling the pressure chamber and running along its edge which rests in a slidable manner with one face upon the press band and which is fastened at a one-piece support plate which is at least partially located in the pressure chamber and a continuous boot elastic in the vertical direction which surrounds the pressure plate and runs along its edge which, at one side, is fastened with the support plate and at the other side with the pressure plate.

While specific embodiments of the invention have been shown and described in detail to illustrate the application of the inventive principles, it will be understood that the invention may be embodied otherwise without departing from such principles.

What is claimed is:

1. Doubled band press apparatus comprising:
   an upper and a lower endless press band each engaged over a pair of reversing drums rotatably supported in a rigid press stand arranged to define a reaction zone between opposed outer sides of said press bands and to be movable about said drums through said reaction zone in a given direction to continuously press an advancing material web therebetween; means defining fluid pressure chambers on inner sides of each of said bands opposed to said outer sides for applying fluid pressure to said advancing material within said reaction zone, said defining means comprising pressure plates affixed in said apparatus bounding said pressure chambers on sides opposite to said inner sides of said press bands and sealing means mounted to said pressure plates extending to circumferentially bound said pressure chambers, said sealing means comprising sliding seal members pressed in sliding engagement with said inner sides of said press bands, each of said members comprising a continuous seal member encircling said pressure chambers, a one-piece support plate having said seal members affixed thereto extending at least partially within said pressure chamber, and a continuous resilient boot member extending generally coextensively with said seal member mounting said support plate on said pressure plate and operating to apply a resilient force tending to press said seal members against said press bands, said boot member being formed with an approximately semi-circular cross-sectional configuration having an opening which faces toward said pressure chamber, and being made of a package of individual metal sheets which are welded together at their edges to form a package which is subsequently bent into said semi-circular cross-sectional configuration and into a configuration which is substantially coextensive with said seal member.

2. Apparatus according to claim 1, wherein said support plate consists of metal having a high tensile strength.

3. Apparatus according to claim 1, wherein said boot member consists of a metal having a high tensile strength.

4. Apparatus according to claim 1, wherein said individual metal sheets comprise electrogalvanically-shaped parts having edges which are welded together.

5. Apparatus according to claim 1, wherein said boot member is welded to said support plate.

6. Apparatus according to claim 1, further comprising a retention member attached to said boot member on a side thereof opposite a side attached to said support plate and means pressing said retention member with a continuous surface encircling said pressure chamber against said pressure plate so as to provide a sealing engagement establishing a fluid pressure seal.

7. Apparatus according to claim 6, further comprising a groove formed in said pressure plate encircling said pressure chamber, wherein said retention member is pressed with a continuous surface against a wall of said groove on a side of said pressure chamber.

8. Apparatus according to claim 6, wherein said retention member comprises an L-shaped cross section having a longer leg resting against a wall of said groove on a side o said pressure chamber and a shorter leg welded with said boot member resting at a horizontal wall of a step-shaped recess in said pressure plate which follows said groove in said pressure chamber.

9. Apparatus according to claim 6, wherein said retention member is bolted directly to said pressure plate.

10. Apparatus according to claim 9, wherein said retention member has a stepped cross section having a horizontal surface welded to said metal boot and a second horizontal surface facing away from said metal boot fastened with screws to said pressure plate.

11. Apparatus according to claim 7, wherein a sealing groove is formed in a wall of said groove in said pressure plate against which said retention member is pressed with an annular sealing wire being inserted in said sealing groove for sealing said pressure chamber against an atmospheric side of said retention member.

12. Apparatus according to claim 1, wherein a second support plate is arranged parallel with said support plate at a side of said boot facing away from said support plate with which support plate the boot is welded and said second support plate is fastened directly at said pressure plate.

13. Apparatus according to claim 12, wherein said second support plate is fastened to said pressure plate with support screws.

14. Apparatus according to claim 1, wherein said support plate comprises passages for supply of fluid pressure medium to said press bands within the pressure chambers.

15. Apparatus according to claim 14, wherein said support plate comprises passages for heat transmitting elements.

16. Apparatus according to claim 14, wherein said support plate comprises indentations having one surface in sliding engagement with said press band and an opposite surface in abutment with heat transmitting elements.

17. Apparatus according to claim 1, wherein said seal members are formed with a rectangular cross section.

18. Apparatus according to claim 1, wherein said seal members consist of plastic material.

19. Apparatus according to claim 18, wherein said plastic material of said seal member is a polyimide.

20. Apparatus according to claim 18, wherein said seal member is clamped tightly in a retaining strip having a U-shaped cross-sectional configuration, said retaining strip being welded to said support plate.

21. Apparatus according to claim 18, wherein the plastic material of said seal member is reinforced with embedded fibers of high tensile strength.

22. Apparatus according to claim 21, wherein said seal member consists of individual layers of a hose mesh consisting of carbon fibers which are impregnated with a high temperature-resistant thermoplastic resin and are pressed to form a compact block.

23. Apparatus according to claim 22, wherein said thermoplastic resin is a polyether-ether ketone.

24. Apparatus according to claim 21, wherein said seal member is reinforced with a sidewise metallic mounting and wherein said mounting is welded to said support plate.

25. Apparatus according to claim 24, wherein said mounting is welded into a depression in said support plate.

26. Apparatus according to claim 24, wherein said seal member is formed from layers of carbon fiber hose mesh impregnated with thermoplastic resin placed into an annularly shaped closed metallic mold having a U-shaped cross section there pressed into a compact block with application of heat and subsequent cooling and subsequently said U-shaped mold is etched away except for a mounting.

27. Apparatus according to claim 26, wherein said molds comprise inside walls having undercuts for better bonding of said seal member with said mounting.

28. Apparatus according to claim 21, wherein a metallic gauze is welded upon said support plate encircling said pressure chamber along its edge upon which are pressed layers of carbon fiber hose mesh impregnated with thermoplastic resin with application of heat and subsequent cooling so as to form said seal member.

29. Apparatus according to claim 1, wherein said seal member consists of a metallic sliding layer selectively electrogalvanized upon said support plate encircling said pressure chamber along its edge.

30. Apparatus according to claim 29, wherein said sliding layer comprises a nickel layer.

31. Apparatus according to claim 29, wherein said inner side of said press band is hard chrome plated to form an opposite sliding face for said sliding layer constituting said seal member.

32. Apparatus according to claim 29, wherein wearinhibiting particles are embedded in at least one of said layers.

33. Apparatus according to claim 32, wherein said wear-inhibiting particles consist of one of silicon carbide, boron nitride or industrial diamonds in the size of a few micrometers.

34. Apparatus according to claim 29, wherein particles with dry lubricant properties are embedded in at least one of the layers.

35. Apparatus according to claim 34, wherein said particles with dry lubricant properties consist of one of graphite, teflon or molybdenum disulfide.

36. Apparatus according to claim 1, further comprising an additional annularly closed external sliding seal assembly fastened in said pressure plate in such a manner that it completely encircles said sealing means to form a hollow space therebetween, said additional external seal assembly including an additional sliding seal member with said hollow space receiving leakage from said pressure chambers with said leakage being aspirated away through bores in said pressure plate from said hollow space.

37. Apparatus according to claim 36, wherein said additional sliding seal member has a face resting in sliding engagement upon said press band, said additional seal member being fastened at an encircling metal boot forming part of said additional sliding seal assembly, said encircling metal boot being fastened at an encircling retention member at a side facing away from said press band, which retention member is again fastened at said pressure plate.

38. Apparatus according to claim 37, wherein said additional seal member consists of an elastomer vulcanized upon a metallic band and said metallic band is welded to said encircling metal boot.

39. Apparatus according to claim 37, wherein said retention member for said additional external sliding seal assembly rests at a wall of a groove in said pressure plate, which wall faces away from said pressure chamber and which groove encircling said pressure chamber around its edge and the retention member for the inner sliding face seal rests at the wall of the same groove which is located on a side of the pressure chamber, both retention members being pressed by means of a wedge-shaped strip against appropriate walls of said groove with said wedge-shaped strip being screwed together with said pressure plate.

40. Apparatus according to claim 39, wherein a collection space for leakage of pressure medium exists at the base of said groove and wherein throughbores are directed from said hollow space to said collection space through said wedge-shaped strip.

41. Apparatus according to claim 40, wherein said bores and said pressure plate with which leakage is aspirated away discharge into said collection space of the base of said groove.

42. Double band press apparatus comprising;
an upper and a lower endless press band each engaged over a pair of reversing drums rotatably supported in a rigid press stand arranged to define a reaction zone between opposed outer sides of said press bands and to be movable about said drums through said reaction zone in a given direction to continuously press an advancing material web therebetween; means defining fluid pressure chambers on inner sides of each of said bands opposed to said outer sides for applying fluid pressure to said advancing material within said reaction zone, said defining means comprising pressure plates affixed in said apparatus bounding said pressure chambers on sides opposite to said inner sides of said press bands and sealing means mounted to said pressure plates extending to circumferentially bound said pressure chambers, said sealing means comprising sliding seal members pressed in sliding engagement with said inner sides of said press bands, each of said seal members comprising a continuous seal member encircling said pressure chambers,
a one-piece support plate having said seal members affixed thereto extending at least partially within said pressure chamber, and
a continuous resilient boot member extending generally coextensively with said seal member mounting said support plate on said pressure plate and operating to apply a resilient force tending to press said seal members against said press bands,
a retention member attached to said boot on a side thereof opposite a side attached to said support plate and means pressing said retention member with a continuous surface encircling said pressure chamber against said pressure plate so as to provide a sealing engagement establishing a fluid pressure seal,
a groove formed in said pressure plate encircling said presure chamber, wherein said retention member is pressed with a continuous surface against a wall of said groove on a side of said pressure chamber, and
said retention member comprising an L-shaped cross section having a longer leg resting against a wall of said groove on a side of said pressure chamber and a shorter leg welded with said boot member resting at a horizontal wall of a step-shaped recess in said pressure plate which follows said groove in said pressure chamber.

43. Apparatus according to claim 42, wherein said retention member is pressed against said wall of said groove by a wedge-shaped strip inserted into said groove.

44. Apparatus according to claim 43, wherein said wedge-shaped strip is fastened with screws to said pressure plate.

45. Double band press apparatus comprising:

an upper and a lower endless press band each engaged over a pair of reversing drums rotatably supported in a rigid press stand arranged to define a reaction zone between opposed outer sides of said press bands and to be movable about said drums through said reaction zone in a given direction to continuously press an advancing material web therebetween; means defining fluid pressure chambers on inner sides of each of said bands opposed to said outer sides for applying fluid pressure to said advancing material within said reaction zone, said defining means comprising pressure plates affixed in said apparatus bounding said pressure chambers on sides opposite to said inner sides of said press bands and sealing means mounted to said pressure plates extending to circumferentially bound said pressure chambers, said sealing means comprising sliding seal members pressed in sliding engagement with said inner sides of said press bands, each of said seal members comprising a continuous seal member encircling said pressure chambers, a one-piece support plate having said seal members affixed thereto extending at least partially within said pressure chamber, and a continuous resilient boot member extending generally coextensively with said seal member mounting said support plate on said pressure plate and operating to apply a resilient force tending to press said seal members against said press bands, a retention member attached to said boot on a side thereof opposite a side attached to said support plate and means pressing said retention member with a continuous surface encircling said pressure chamber against said pressure plate so as to provide a sealing engagement establishing a fluid pressure seal, a groove formed in said pressure plate encircling said pressure chamber, wherein said retention member is pressed with a continuous surface against a wall of said groove on a side of said pressure chamber, and a sealing groove being formed in a wall of said groove in said pressure plate against which said retention member is pressed with an annular sealing wire being inserted in said sealing groove for sealing said pressure chamber against an atmospheric side of said retention member.

46. Apparatus according to claim 45, wherein said sealing wire has a round cross-sectional configuration.

47. Apparatus according to claim 45, wherein said sealing wire consists of aluminum.

48. Apparatus according to claim 45, wherein said sealing wire consists of soft copper.

49. Apparatus according to claim 45, wherein said sealing wire consists of an elastomer.

50. Double band press apparatus comprising:

an upper and a lower endless press band each engaged over a pair of reversing drums rotatably supported in a rigid press stand arranged to define a reaction zone between opposed outer sides of said press bands and to be movable about said drums through said reaction zone in a given direction to continuously press an advancing material web therebetween; means defining fluid pressure chambers on inner sides of each of said bands opposed to said outer sides for applying fluid pressure to said advancing material within said reaction zone, said defining means comprising pressure plates affixed in said apparatus bounding said pressure chambers on sides opposite to said inner sides of said press bands and sealing means mounted to said pressure plates extending to circumferentially bound said pressure chambers, said sealing means comprising sliding seal members pressed in sliding engagement with said inner sides of said press bands, each of said seal members comprising a continuous seal member encircling said pressure chambers, a one-piece support plate having said seal members affixed thereto extending at least partially within said pressure chamber, and a continuous resilient boot member extending generally coextensively with said seal member mounting said support plate on said pressure plate and operating to apply a resilient force tending to press said seal members against said press bands, said seal members consisting of plastic material which is reinforced with embedded fibers of high tensile strength, and a metalic gauze welded upon said support plate encircling said pressure chamber along its edge upon which are pressed layers of carbon fiber hose mesh impregnated with thermoplastic resin with application of heat and subsequent cooling so as to form said seal member.

51. Apparatus according to claim 50, wherein said metallic gauze is welded into a recess in said support plate.

52. Apparatus according to claim 50, wherein said metallic gauze consists of stainless steel.

53. Double band press apparatus comprising:

an upper and a lower endless press band each engaged over a pair of reversing drums rotatably supported in a rigid press stand arranged to define a reaction zone between opposed outer sides of said press bands and to be movable about said drums through said reaction zone in a given direction to continuously press an advancing material web therebetween; means defining fluid pressure chambers on inner sides of each of said bands opposed to said outer sides for applying fluid pressure to said advancing material within said reaction zone, said defining means comprising pressure plates affixed in said apparatus bounding said pressure chambers on sides opposite to said inner sides of said press bands and sealing means mounted to said pressure plates extending to circumferentially bound said pressure chambers, said sealing means comprising sliding seal members pressed in sliding engagement with said inner sides of said press bands, each of said seal members comprising a continuous seal member encircling said pressure chambers, a one-piece support plate having said seal members affixed thereto extending at least partially within said pressure chamber, and a continuous resilient boot member extending generally coextensively with said seal member mounting said support plate on said pressure plate and operating to apply a resilient force tending to press said seal members against said press bands, said boot member being formed with an approximately semi-circular cross-sectional configuration having an opening which faces toward said pressure chamber, and being made of a package of individual metal sheets consisting of electrogalvanically formed parts which are already separated into said semi-circular cross-sectional configuration galvanically and into a configuration which is substantially coextensive with said seal member.

* * * * *